United States Patent
Li

(10) Patent No.: US 8,077,237 B2
(45) Date of Patent: Dec. 13, 2011

(54) METHOD AND APPARATUS FOR CONTROLLING DUAL CONVERSION GAIN SIGNAL IN IMAGING DEVICES

(75) Inventor: Xiangli Li, Boise, ID (US)

(73) Assignee: Aptina Imaging Corporation, George Town, Grand Cayman (KY)

( * ) Notice: Subject to any disclaimer, the term of this patent is extended or adjusted under 35 U.S.C. 154(b) by 568 days.

(21) Appl. No.: 11/873,314

(22) Filed: Oct. 16, 2007

(65) Prior Publication Data

US 2009/0096890 A1 Apr. 16, 2009

(51) Int. Cl.
*H04N 5/335* (2011.01)
(52) U.S. Cl. ............. 348/297; 348/294; 348/296
(58) Field of Classification Search ......... 348/294–299, 348/312, 314; 250/208.1
See application file for complete search history.

(56) References Cited

U.S. PATENT DOCUMENTS

| | | | | |
|---|---|---|---|---|
| 5,619,262 | A * | 4/1997 | Uno .............................. | 348/297 |
| 6,489,619 | B2 | 12/2002 | Street ........................ | 250/370.09 |
| 6,809,766 | B1 * | 10/2004 | Krymski et al. ............. | 348/296 |
| 7,075,049 | B2 | 7/2006 | Rhodes et al. ............. | 250/208.1 |
| 2004/0251394 | A1* | 12/2004 | Rhodes et al. ............. | 250/208.1 |
| 2004/0252211 | A1 | 12/2004 | Rhodes .......................... | 348/308 |
| 2005/0012168 | A1 | 1/2005 | Hong ............................. | 257/428 |
| 2006/0011810 | A1 | 1/2006 | Ando et al. ................. | 250/208.1 |
| 2006/0105489 | A1 | 5/2006 | Rhodes ............................ | 438/48 |
| 2006/0157761 | A1 | 7/2006 | Park et al. ..................... | 257/293 |
| 2006/0181622 | A1 | 8/2006 | Hong .............................. | 348/248 |
| 2006/0181626 | A1 | 8/2006 | Lee ............................... | 348/308 |
| 2006/0221667 | A1 | 10/2006 | Ogura et al. .................. | 365/149 |
| 2006/0243887 | A1 | 11/2006 | Boemler .................... | 250/208.1 |
| 2006/0261431 | A1 | 11/2006 | Kim et al. ..................... | 257/462 |
| 2007/0012964 | A1 | 1/2007 | McKee ......................... | 257/291 |
| 2007/0013797 | A1 | 1/2007 | McKee ......................... | 348/308 |
| 2007/0040922 | A1 | 2/2007 | McKee et al. ................. | 348/308 |

FOREIGN PATENT DOCUMENTS

WO 2006/113427 10/2006

(Continued)

OTHER PUBLICATIONS

Akahane et al. (2006) A Sensitive and Linearity Improvement of a 100-dB Dynamic Range CMOS Image Sensor Using a Lateral Overflow Integration Capacitor; IEEE Journal of Solid-State Circuits; 41:851-858.

(Continued)

*Primary Examiner* — John Villecco
*Assistant Examiner* — Mark Monk
(74) *Attorney, Agent, or Firm* — Kramer Levin Naftalis & Frankel LLP

(57) ABSTRACT

A image-sensing device includes an array of light-sensing pixels arranged in rows, a readout circuit, and a control logic coupled to the rows of pixels. Each of the pixels has a respective conversion gain that changes to a respective second value from a respective first value within a settling time when a control signal is applied to the pixel. The readout circuit is coupled to the array of pixels and samples the rows of pixels once in an array sampling process. The control logic applies the control signal to the pixels of at least one row after sampling of the pixels in at least one other row of the array has begun but at least the settling time before the at least one row is sampled.

20 Claims, 6 Drawing Sheets

ΔT: DCG SETTLING TIME FOR THE LOOK-AHEAD DCG CONTROL SCHEME

FOREIGN PATENT DOCUMENTS

| WO | 2006/124592 | 11/2006 |
|----|-------------|---------|
| WO | 2007/016168 | 2/2007  |
| WO | 2007/021626 | 2/2007  |

OTHER PUBLICATIONS

Akahane et al. (2006) Wide Dynamic Range CMOS Image Sensors for High Quality Digital Camera, Security, Automotive and Medical Application; 5th IEEE Conference on Sensors; pp. 396-399.

Mendis et al. (1997) CMOS Active Pixel Image Sensors for Highly Integrated Imaging Systems; IEEE Journal of Solid-State Circuits; 32:187-197.

Sugawa et al. (2005) A 100dB Dynamic Range CMOS Image Sensor Using a Lateral Overflow Integration Capacitor; 2005 IEEE International Solid-State Circuits Conference; pp. 352-603.

\* cited by examiner

US 8,077,237 B2

METHOD AND APPARATUS FOR CONTROLLING DUAL CONVERSION GAIN SIGNAL IN IMAGING DEVICES

TECHNICAL FIELD

Embodiments of the present invention relate generally to imaging devices, and, more particularly, to dual conversion gain control scheme for imaging devices.

BACKGROUND OF THE INVENTION

Imaging devices, including charge coupled devices (CCD) and complementary metal-oxide-semiconductor (CMOS) imagers, are commonly used in image sensing applications such as digital cameras, video camcorders, scanners and the like. A prior art imager typically contains a focal plane array of light-sensing elements, referred to as picture elements or "pixels," and readout circuitry that outputs signals indicative of the light sensed by the pixels. Each light-sensing element contains a photosensor that generates and accumulates photo-generated charge proportional to the amount of the incident light striking the surface of the light-sensing element. That is, the photosensor converts the incoming light photons to an electrical signal in the form of electric charge. Moreover, the sensitivity of conversion from photons to electrons is often measured with a quantity called conversion gain.

In the recent years, techniques have been developed to enable pixels with dual conversion gain for reasons such as performance enhancement. For example, dual conversion gain-enabled pixels can yield high conversion gain and sensitivity to achieve excellent low-light performance. Furthermore, dual conversion gain-enabled pixels can also yield high full well capacitance to achieve high dynamic range.

FIG. 1 illustrates one example of a prior art dual conversion gain-enabled pixel the operation of which will be explained in more detail below. The conversion gain of a dual conversion gain-enabled pixel, such as the one depicted in FIG. 1, can be altered between a first value and a second value by controlling the signal that turns on and off the dual conversion gain transistor associated with the pixel.

There are basically two schemes of controlling the dual conversion gain transistors of an imager pixel array arranged in rows of pixels. One control scheme involves turning on only the dual conversion gain transistors associated with the row of pixels that is being read out and keeping off the other dual conversion gain transistors for all other rows not being read out. However, as will be explained in more detail below, this scheme tends to result in the problem of insufficient time for the conversion gain to fully settle to the second value from the first value. The other control scheme involves turning on the entire array of dual conversion gain transistors during the readout of the pixel array. Although this scheme solves the issue with insufficient settling time, it tends to result in reliability issue in the form of degradation of the gate oxide layer of the dual conversion gain transistors due to high stress. This is because a voltage is applied to the gate of each of the dual conversion gain transistors for the duration of sampling of the pixel array.

Accordingly, there is a need and desire for a dual conversion gain control scheme that provides sufficient time for pixel conversion gain to settle and alleviates reliability issue with dual conversion gain transistor gate oxide.

DETAILED DESCRIPTION OF PREFERRED EMBODIMENTS

Certain details are set forth below to provide a sufficient understanding of embodiments of the invention. However, it will be clear to one skilled in the art that embodiments of the invention may be practiced without these particular details. Moreover, the particular embodiments of the present invention described herein are provided by way of example and should not be used to limit the scope of the invention to these particular embodiments. In other instances, well-known circuits, control signals, and timing protocols have not been shown in detail in order to avoid unnecessarily obscuring the invention.

Figure 1:
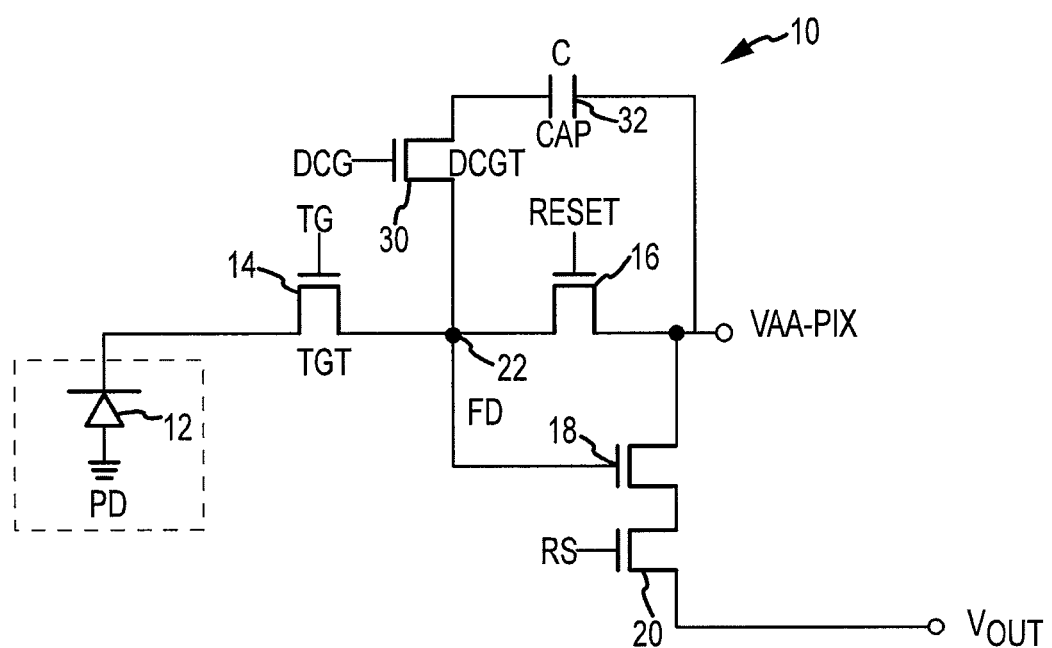
FIG. 1 is a schematic diagram of an example of a prior art dual conversion gain pixel of an imaging device.

FIG. 1 illustrates a schematic diagram of an example of a prior art dual conversion gain-enabled pixel cell 10 of an imaging device. Similar to most four-transistor (4T) pixels, the pixel cell 10 includes a photosensor 12 (PD), floating diffusion node 22 (FD), transfer transistor 14 (TGT), reset transistor 16, source follower transistor 18, and row select transistor 20. In addition, pixel cell 10 also includes a dual conversion gain element, configured as a n-channel metal-oxide-semiconductor (NMOS) dual conversion gain transistor 30 (DCGT) and capacitor 32 (CAP) in this example.

The dual conversion gain transistor 30 and capacitor 32 form a conversion gain altering circuit for the floating diffusion node 22 of pixel cell 10. The dual conversion gain transistor 30 has its source terminal connected to the floating diffusion node 22 and its drain terminal connected to a first side of the capacitor 32. The gate of the dual conversion gain transistor 30 is connected to receive a control signal. The second side of the capacitor is connected to the pixel voltage supply Vaa-pix. The dual conversion gain control signal (DCG) is generated by a control logic. The control logic may be embodied, for example, as a control circuit in the readout circuitry (e.g. in the row address decoder), in the timing and control circuitry of the imaging device, or in other part of the imaging device that controls the operation of the pixel array.

When the control signal DCG is generated and applied to the gate of the dual conversion gain transistor 30, the dual conversion gain transistor 30 is turned on, or activated, which in turn connects the capacitor 32 to the floating diffusion node 22. This increases the charge storage capacity of the pixel cell 10 beyond the capacity of the floating diffusion node 22. In other words, the pixel cell 10 has a first conversion gain based on the inherent charge storage capacity of the floating diffusion node 22, and the pixel cell 10 attains a second conversion gain based on the charge storage capacity of the floating diffusion node 22 and that of the capacitor 32 when the dual conversion gain transistor 30 switches in capacitance C of the capacitor 32. The first conversion gain is beneficial for low-light conditions while the second conversion gain is beneficial for bright-light conditions. As will be discussed later, the DCG control signal may be generated at different times depending upon the application and/or user preferences.

Typically, operation of pixel sampling involves a reset stage and a signal sampling stage, and will be described now with reference to the timing diagrams in FIGS. 2, 3, and 4. In general, the pixel-to-column sampling period for each row of pixels includes several steps. First, a row select signal (RS) is applied to turn on the respective row select transistor 20 for the pixels in the row that is selected by a readout circuitry in an image frame sampling sequence. The sampling sequence may sample the top row of pixels in the pixel array first, the second row of pixels next, and moving toward the bottom row of the pixel array, or in the opposite direction. Alternatively, the pixel array may be sampled in some other pattern. In any event, in FIGS. 2-4, the notation of row (n), row (n+1), row (n+2), row (n+m), etc., simply indicates that row (n+1) is the row that is sampled immediately following row (n) in the sampling sequence, row (n+2) is the second row to be sampled after row (n), and row (n+m) is the (m)th row to be sampled after row (n) in the sampling sequence.

With the row select transistors turned on in the row being sampled, a reset signal (RST) is applied to turn on reset transistor 16 in each of the pixels of the selected row to reset the floating diffusion region of each pixel of the selected row to Vaa-pix. Next, a sample-hold-reset signal (SHR) is applied to enable a set of transistors (not shown) to allow sampling of the reset voltage Vrst from each pixel of the selected row by a column sample and hold circuitry, thus completing the reset stage. Thereafter, a transfer signal (TX) is applied to turn on the transfer transistor 14 of each pixel of the selected row, thereby transferring electrical charge accumulated by the photosensor 12 to the floating diffusion node 22. Then, a sample-hold-sample signal (SHS) is applied to enable another set of transistors (not shown) to allow sampling of the signal voltage Vsig from each pixel of the selected row by the column sample and hold circuitry, thus completing the sampling stage. At this point, the readout circuitry stops applying the row select signal RS.

During the pixel reset period for each row of the pixel array, the floating diffusion node 22 and the photosensor 12 of each pixel in the respective row, row (n+m) for example, is reset. More specifically, the RST signal and the TX signal are both applied, turning on the reset transistor 16 and transfer transistor 14 of each pixel of row (n+m), to apply Vaa-pix to the floating diffusion node 22 and photosensor 12 of each pixel of row (n+m). The voltage Vaa-pix, being a relatively high voltage (e.g. 2.8 v), allows the floating diffusion region of the pixel to reset and the photosensor 12 to be fully depleted. When the photosensor 12 is fully depleted, the photosensor 12 returns to its respective pinned voltage (e.g. 1.5 v). The reset period for row (n+m) is followed by the integration period for row (n+m), during which the charge on the photosensor 12 of each pixel of row (n+m) begins to be accumulated. This way, when the readout circuit selects row (n+m) to sample the pixels of row (n+m), as described above, each photosensors 12 of row (n+m) has been accumulating charge for the time it takes to sample m rows (hence known as m rows integration time). Finally, it should be noted that the order of pixel-to-column sampling of row (n) and the reset of pixels of row (n+m) does not have to be in the order shown in FIGS. 2-4 and can be swapped. For example, even though FIGS. 2-4 show that the pixel-to-column sampling of row (n) occurs before the reset of pixels of row (n+m), the reset of pixels of row (n+m) can take place before the pixel-to-column sampling of row (n), and the same applies for the rest of the rows.

Figure 2:
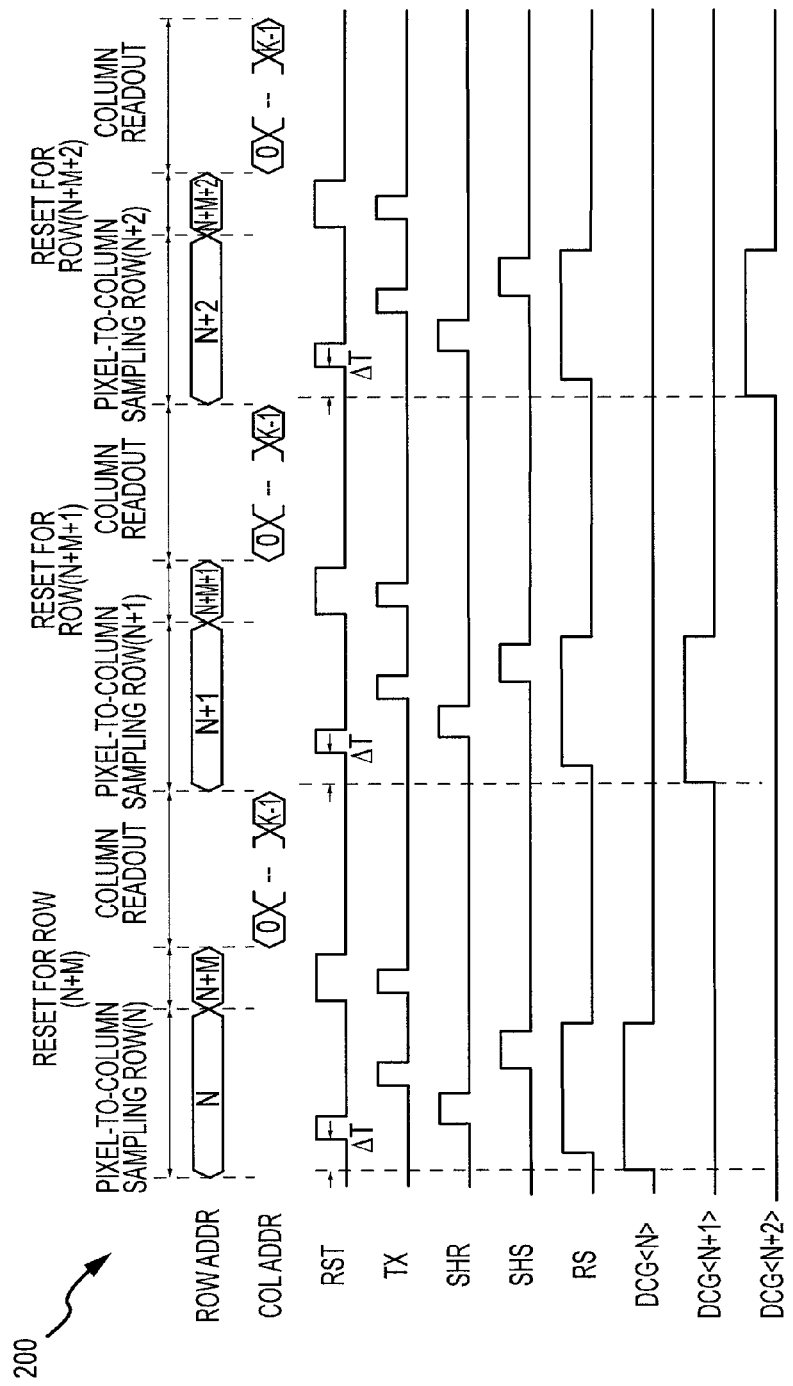
FIG. 2 is a timing diagram of a prior art row-wise dual conversion gain control and readout scheme.
Figure 3:
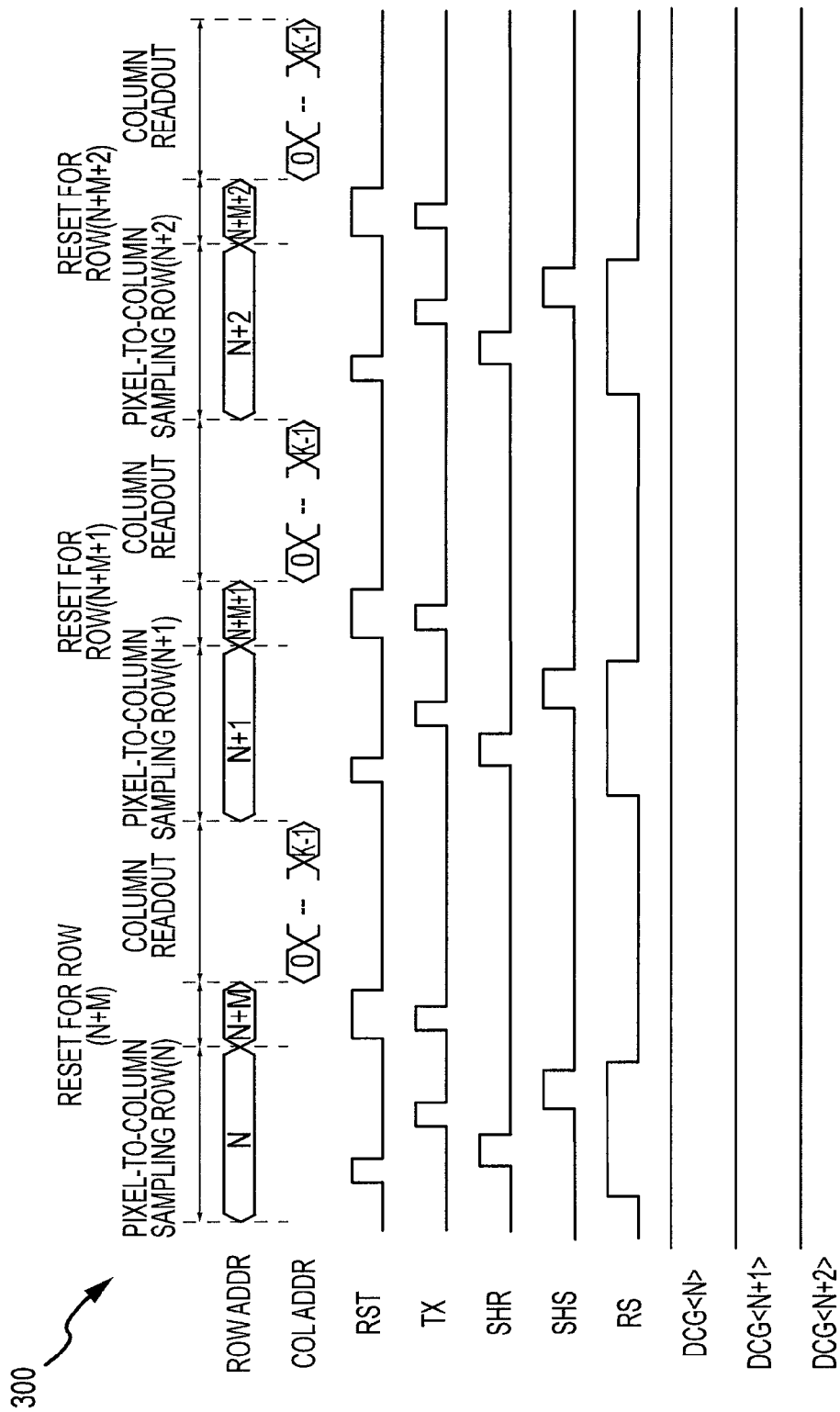
FIG. 3 is a timing diagram of a prior art global dual conversion gain control and readout scheme.
Figure 4:
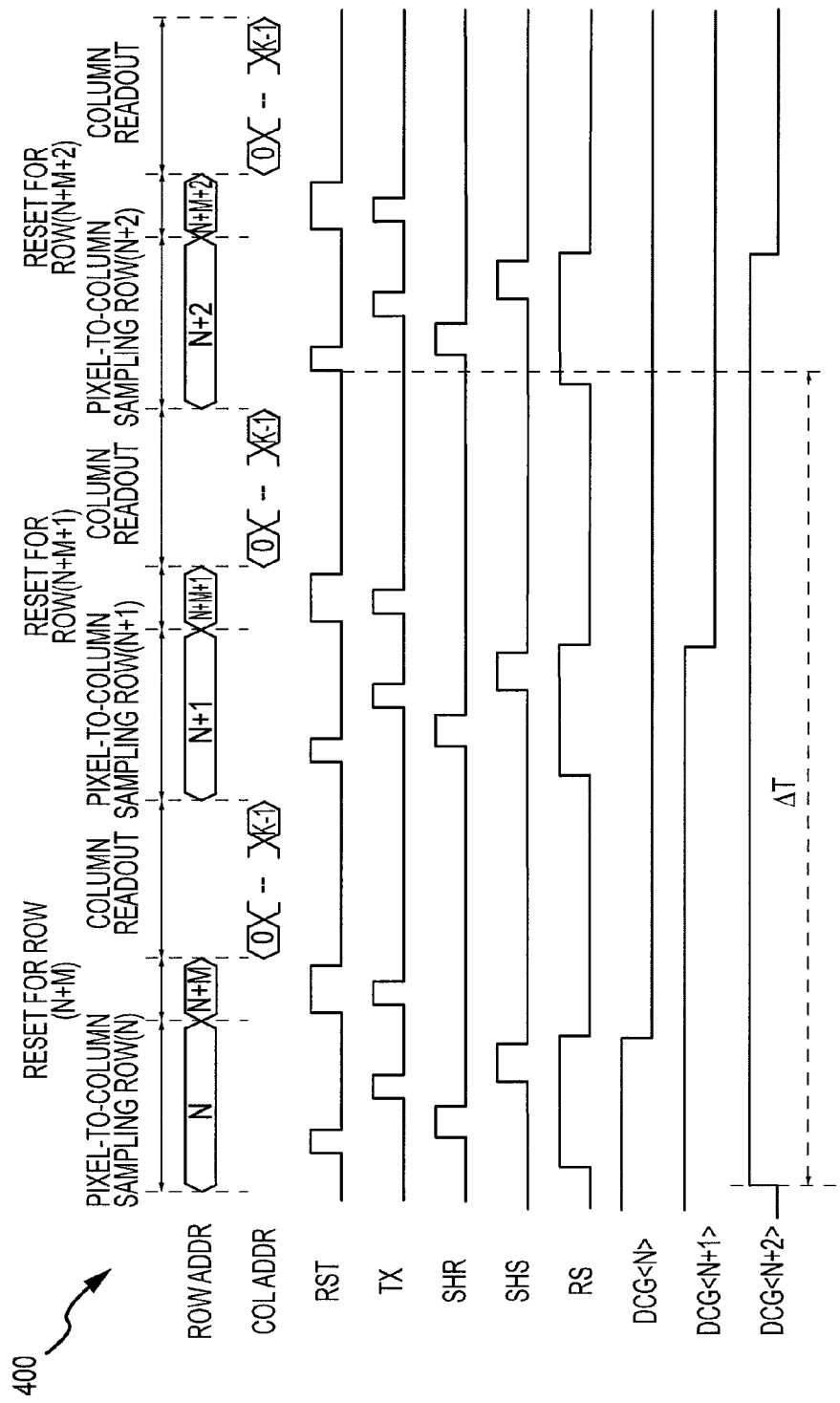
FIG. 4 is a timing diagram of a look-ahead dual conversion gain control and readout scheme in accordance with an embodiment of the invention.

As shown in FIGS. 2-4, sampling of the pixel array also includes column readout for each row of pixels, which follows the pixel-to-column sampling of pixels of each respective row. During the column readout period, the signals sampled from each of the k pixels in a row, in the form of Vrst and Vsig as described above and held in the column sample and hold circuitry, are transferred to a differential amplifier to provide a differential signal (Vsig−Vrst) to be converted into a respective digital signal for further processing.

In the case where the pixels are configured for dual conversion gain, such as having a dual conversion gain element (e.g. transistor 30 and capacitor 32) for each pixel, the dual conversion gain control signal DCG is applied to enable the dual conversion gain element of each pixel in a row to be sampled as described above. The timing and duration of when the DCG signal is applied to each row will be explained in more detail below.

FIG. 2 illustrates a timing diagram 200 of a prior art row-wise dual conversion gain control and readout scheme. In FIG. 2, DCG<n> is the DCGT gate control signal for the pixel on the (n)th row. Likewise, DCG<n+1> and DCG<n+2> are the DCGT gate control signals for the (n+1)th and (n+2)th rows, respectively.

As shown in FIG. 2, the control signal DCG<n> is only generated and applied to the dual conversion gain elements associated with the pixels of the (n)th row for approximately the duration of pixel-to-column sampling of the (n)th row, or readout, of the (n)th row. Under the prior art row-wise dual conversion gain control scheme, the control signal DCG is applied to each row shortly before the readout process of each row begins (which starts with the reset signal RST resetting the reset transistor 16 in each pixel). As shown in FIG. 2, the duration Δt is the period of time between the time when the control signal DCG is set to a high voltage to change the conversion gain of pixels in a row to be sampled and the time when the readout process starts for the particular row. Thus, under this control scheme, the dual conversion gain-enabled pixels only have the brief period of time Δt as the settling time for the respective conversion gain.

When a dual conversion gain transistor is turned on, some residual channel resistance remains between the source and drain terminals of the dual conversion gain transistor. As such, the resultant RC delay requires a certain amount of time for the conversion gain to settle to the new value after the dual conversion gain transistor has been turned on. However, since pixel-to-column readout budget is very limited, especially in high-speed operations, the RC delay as described above is an issue in the operation of dual conversion gain-enabled pixels. In particular, if the conversion gain in the pixels is not fully settled before the pixels are sampled, the variance in the floating diffusion node capacitance will change from pixel to pixel, and thereby resulting in pixel-wise fixed-pattern noise.

FIG. 3 illustrates a timing diagram of another prior art global dual conversion gain control and readout scheme. As in FIG. 2, DCG<n> is the DCGT gate control signal for the pixel on the (n)th row, and DCG<n+1> and DCG<n+2> are the DCGT gate control signals for the (n+1)th and (n+2)th rows, respectively. Under the global dual conversion gain control scheme, the entire array of dual conversion gain elements are either activated (turned on) or deactivated (turned off) during the readout of the entire pixel array. As illustrated in FIG. 3, in one example of an application of the control scheme, the DCGT gate control signals are generated and kept high to keep the entire array of dual conversion gain transistors on for the duration of pixel array sampling. Under this control scheme, the capacitance load for the whole dual conversion gain elements is quite large and, thus, it takes a long time to charge or discharge the capacitance. Nevertheless, since the dual conversion gain transistors can be turned on and off between different image frames, there should not be an issue with the settling time as previously described.

However, since the dual conversion gain transistor 30 in a dual conversion gain element is connected to the floating diffusion node 22, which is reset to Vaa_pix at the beginning of each readout, the gate voltage of each dual conversion gain transistor needs to be boosted to at least one threshold above the voltage of Vaa_pix in order to fully reset the floating diffusion node to Vaa_pix. Under the global dual conversion gain control scheme as illustrated in FIG. 3, the DCGT gate is under high voltage potential stress for the duration of whole-frame readout. Consequently, gate oxide reliability issue arises.

FIG. 4 illustrates a timing diagram of a look-ahead dual conversion gain control and readout scheme in accordance with an embodiment of the invention. As illustrated in FIG. 4, when the (n)th row is being read out, the control scheme can generate a control signal DCG<n+p> to boost the DCGT gates of the dual conversion gain transistors associated with the (n+p)th row (e.g. p=2 is used in FIG. 4 as an example). The control signal DCG<n+p> is kept high until the completion of pixel-to-column readout for the (n+p)th row. After the pixel-to-column readout of the (n)th row is complete, the control signal DCG<n> is set to a lower voltage value to turn off the dual conversion gain transistors associated with the (n)th row. Correspondingly, the voltage on the gates of the dual conversion gain transistors of the (n)th row is returned to a low voltage value.

When the time to read out the (n+p)th row arrives, the DCGT gate has already been boosted for a p-row integration time. The integration time per row varies depending on the design and operation of the pixels and is typically around 10 μs, plus or minus a few micro seconds. In determining the minimum number of rows to look ahead and pre-boost in order to provide sufficient conversion gain settling time for those rows of pixels yet to be sampled, row-wise integration time and the RC delay of a particular design need to be taken into consideration. The minimum number of rows to look ahead generally should be one (i.e. p=1 in such case), which means the control scheme looks only one row ahead to turn on the dual conversion gain transistors of the row to be sampled next and pre-boosts the gates of those dual conversion gain transistors. In other applications, the minimum number of rows to look ahead may be two (i.e. p=2) or, less desirably, three (i.e. p=3) or more depending on the design and operation of the pixels, number of pixels per row, etc.

Under the look-ahead dual conversion gain control scheme, the rows of dual conversion gain elements are activated dynamically, and at most only (p+1) rows of dual conversion gain transistors are turned on (and their respective gates boosted) at any one time during the time of a whole-frame readout. Consequently, the reliability issue with dual conversion gain transistor gate oxide is alleviated.

As shown in FIG. 4, the duration Δt is the available conversion gain settling time under the look-ahead dual conversion gain control scheme. FIG. 4 illustrates an embodiment of the look-ahead control scheme which provides a Δt that is approximately two-row integration time-from the beginning of (n)th row readout to the beginning of the (n+2)th row readout. In other words, each of the dual conversion gain-enabled pixels in the (n+2)th row has two-row integration time for its conversion gain to settle to the new value before the (n+2)th row is sampled. In image-sensing devices where the settling time for each dual conversion gain-enabled pixel is less than one-row integration time, the look-ahead control scheme provides ample time for the conversion gain to fully settle before the pixels are sampled.

It should be noted that, although the control signal DCG<n+p> as illustrated in FIG. 4 is generated just before the readout of the (n)th row and is stopped upon the completion of the readout of the (n+p)th row (where p=2 is used as an example in FIG. 4), the control signal DCG<n+p> can be generated at a different time. More specifically, in one embodiment, the look-ahead control scheme generates the control signal DCG<n+p> at a time sufficiently early such that the duration from the time when DCG<n+p> is generated to the time when the readout of (n+p)th row begins is at least the minimum time required for conversion gain to fully settle. Although a two-row look-ahead example is shown in FIG. 4, it should be understood as explained above that the control scheme is not limited to looking ahead by a specific number of rows. For example, the control scheme can look one row ahead (i.e. p=1), three rows ahead (i.e. p=3), or any other number of rows ahead.

In one embodiment, the look-ahead dual conversion gain control scheme can generate control signals DCG<n+p>-DCG<n+p+q> to simultaneously activate the DCGT gates of the dual conversion gain transistors associated with the (n+p) th row through the (n+p+q)th row when the (n)th row is sampled. In other words, the control scheme can look ahead and activate multiple rows of dual conversion gain elements in a "group" or a "batch" fashion. For example, when m is set to be 1 and p is set to be 4, the control scheme can pre-boost the gates of those dual conversion gain transistors associated with rows 6 through 10 when row 5 is sampled, and the control scheme will pre-boost the gates of those dual conversion gain transistors associated with rows 11 through 15 when row 10 is sampled.

In another embodiment, the look-ahead dual conversion gain control scheme can look ahead by a varying number of rows during the sampling of an image frame. More specifically, the control scheme can generate control signals in advance both one row at a time and multiple rows at a time (in a batch, as previously described) when sampling an image frame. For example, the control scheme can look ahead and pre-boost in a batch fashion, as previously described, for a first number of rows and then switch to looking ahead and pre-boosting one row at a time for a second number of rows, or vice versa.

It will be appreciated by those of ordinary skill in the art that the look-ahead control scheme thus described may be varied in many ways. For example, the look-ahead control scheme can be combined with the global dual conversion gain control readout scheme such that the rows of dual conversion gain elements are activated in advance, but not from the start of reading out of the pixel array. Additionally, whether looking ahead one row at a time or multiple rows at a time or a combination thereof, the rows of dual conversion gain elements can be kept activated for the remaining duration of the sampling of the entire image frame.

Figure 5:
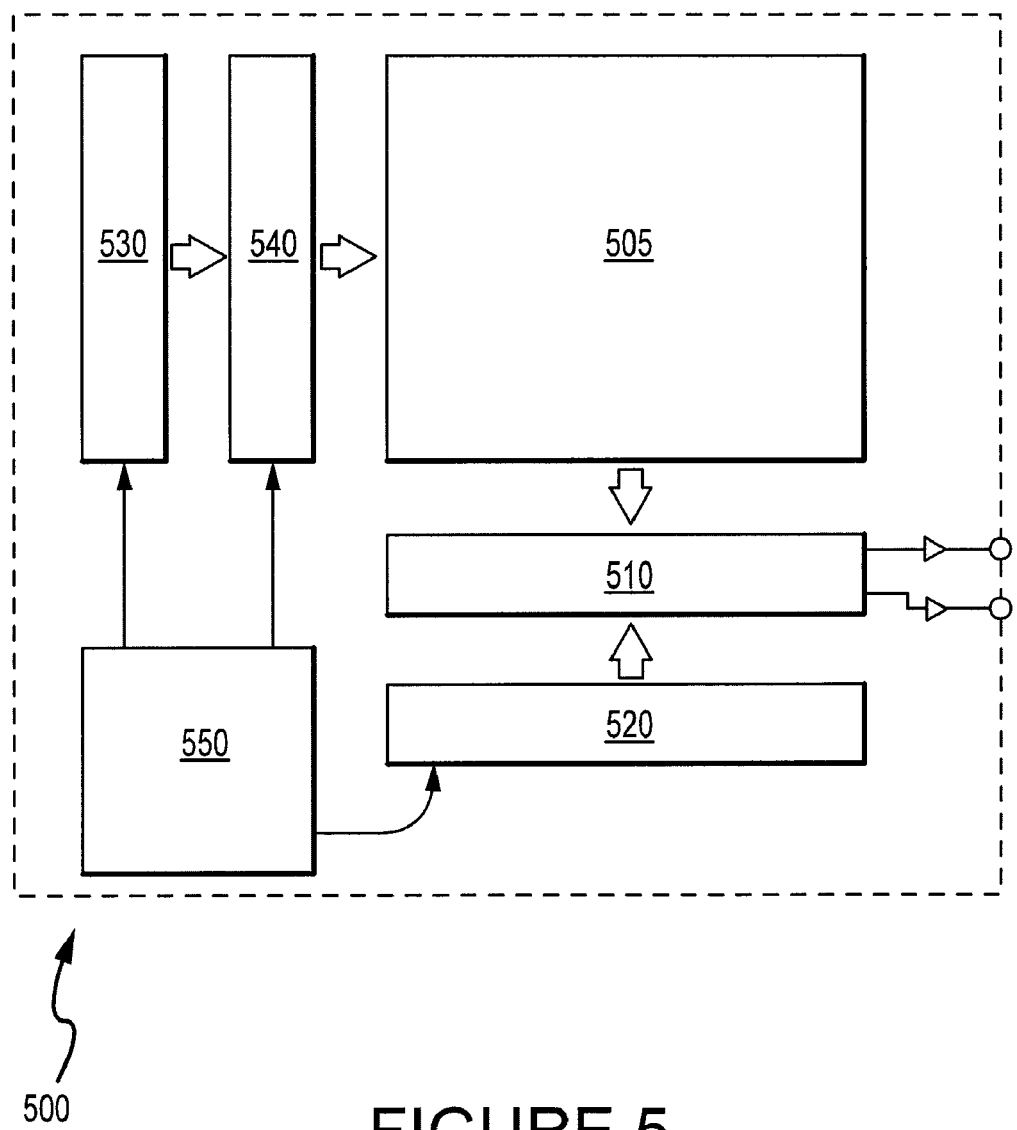
FIG. 5 is a simplified block diagram of an imaging device incorporating the look-ahead dual conversion gain control scheme in accordance with an embodiment of the invention.

FIG. 5 illustrates a simplified block diagram of an imaging device 500 incorporating the look-ahead dual conversion gain control scheme in accordance with an embodiment of the invention. Much of the components shown in FIG. 5 are well known in the art. Therefore, in the interest of brevity, an explanation of the structure and operation of these components will not be repeated. The imaging device 500 includes a pixel array 505, a control circuit 550, and a readout circuitry having a row address decoder 530, a row driver 540, a column address decoder 520, and a column driver 510. Pixel array 505 comprises a plurality of pixels, such as pixel 10 in FIG. 1, arranged in a plurality of columns and rows. The pixels of each row in array 505 can all be turned on at the same time by a row select line and the pixels of each column are selectively output by a column select line. The row lines are selectively activated by the row driver 540 in response to row address decoder 530. Likewise, the column select lines are selectively activated by the column driver 510 in response to column address decoder 520. The imaging device 500 may be a CCD imager or CMOS imager constructed to implement the look-ahead dual conversion gain control scheme in accordance with any of the illustrated embodiments.

The imaging device 500 is operated by the control circuit 550, which controls address decoders 530, 520 for selecting the appropriate row and column lines for pixel readout, and row and column driver circuitry 540, 510 for applying voltages to drive transistors of the selected row and column lines. In one embodiment, the look-ahead dual conversion gain control scheme is implemented by a control logic that is located in the row address decoder 530. In another embodiment, the control logic implementing the look-ahead dual conversion gain control scheme resides in the control circuit 550. In yet another embodiment, a control logic that implements the look-ahead control scheme is in another part of the imaging device 500 not shown in FIG. 5.

Figure 6:
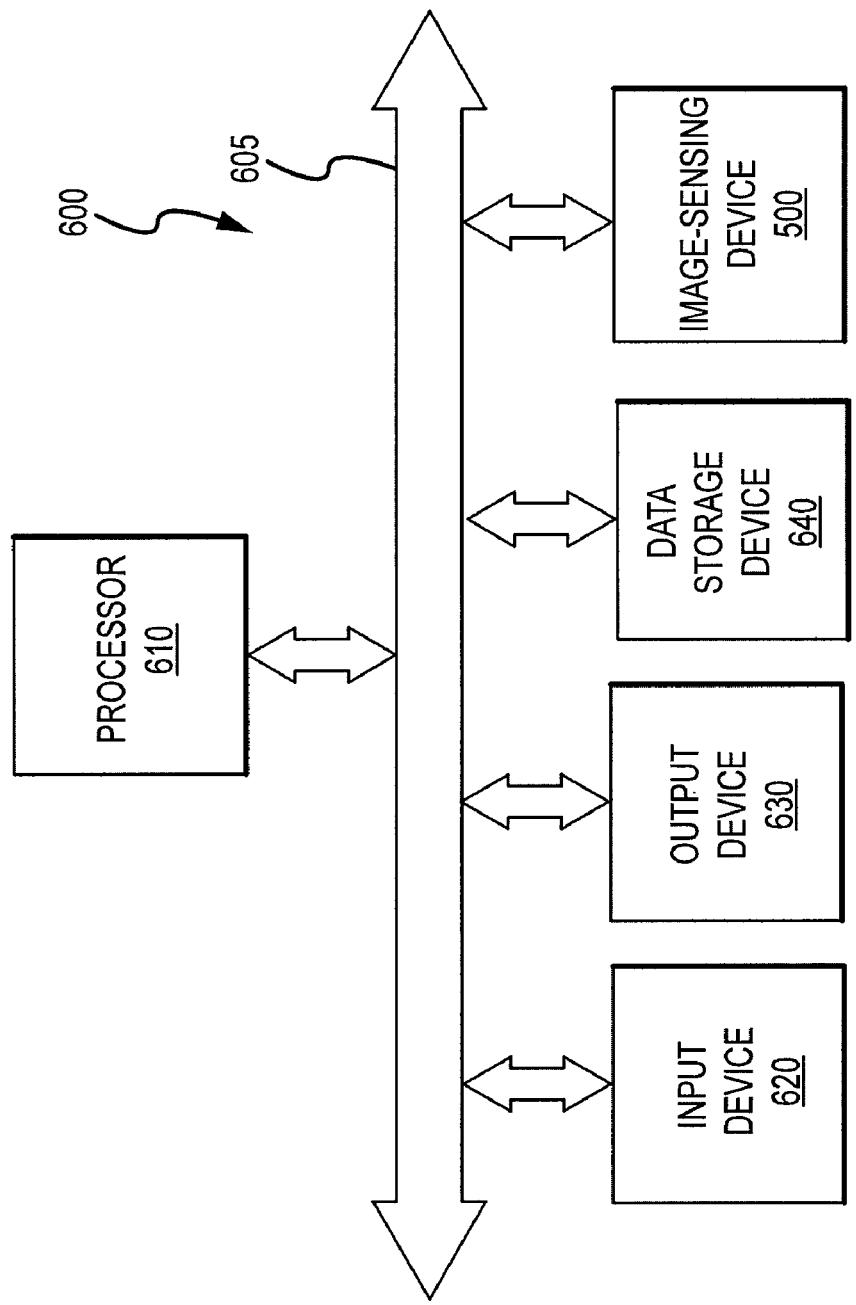
FIG. 6 is a simplified block diagram of a processor-based system having an imaging device that incorporates the look-ahead dual conversion gain control scheme in accordance with an embodiment of the invention.

FIG. 6 illustrates a simplified block diagram of a processor-based system 600 having an imaging device that incorporates the look-ahead dual conversion gain control scheme in accordance with an embodiment of the invention. Much of the components shown in FIG. 6 are well known in the art. Therefore, in the interest of brevity, an explanation of the structure and operation of these components will not be repeated. The processor-based system includes an input device 620, an output device 630, a data storage device 640, the imaging device 500 from FIG. 5, and a processor 610 that communicates with the various devices over a data bus 605. The imaging device 500 may be a CCD imager or CMOS imager constructed to implement the look-ahead dual conversion gain control scheme in accordance with any of the illustrated embodiments.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method, comprising:
   causing a respective charge storage capacity of each pixel of a first row of a plurality of light-sensing pixels arranged in rows to change to a respective second capacity value from a respective first capacity value at a first instant;
   causing a respective charge storage capacity of each pixel of at least a second row of the plurality of pixels to change to a respective fourth capacity value from a respective third capacity value at a second instant that is at least one row before the second row is sampled, wherein the second instant occurs after the first instant; and
   sampling the pixels of the second row at least a settling time of the charge storage capacity after the second instant.

2. The method of claim 1, further comprising:
   changing the respective charge storage capacity of each pixel of the second row from the respective fourth capacity value to a respective fifth capacity value after the pixels of the second row have been sampled.

3. The method of claim 2 wherein the respective fifth capacity value is equal to the respective third capacity value.

4. The method of claim 1 wherein the act of causing the respective charge storage capacity of each pixel of the at least a second row of the plurality of pixels to change from the respective third capacity value comprises:
   causing a respective charge storage capacity of each pixel of a plurality of rows to change to the respective fourth capacity value from the respective third capacity value at the second instant.

5. A method, comprising:
   initiating a changing of a respective charge storage capacity of each pixel of at least a single row of pixels to a respective second capacity value from a respective first capacity value, wherein the initiating occurs at least one row before the single row of pixels is sampled; and
   sampling the single row of pixels at least a settling time after the initiating but substantially after a sampling of a previous row of pixels has begun, wherein the settling time comprises a period of time for the respective charge storage capacity to change from the respective first capacity value to the respective second capacity value.

6. The method of claim 5, further comprising:
   changing the respective charge storage capacity of each pixel of the single row of pixels to a respective third capacity value when sampling of the single row is complete.

7. The method of claim 5 wherein:
   the at least a single row of pixels comprises a plurality of rows of pixels; and
   the initiating comprises simultaneously changing a respective charge storage capacity of each pixel of the plurality of rows of pixels to the respective second capacity value from the respective first capacity value.

8. The method of claim 1, wherein the sampling of the pixels comprises:
   resetting each pixel of the second row; and
   sampling a voltage signal of each pixel of the second row after the resetting.

9. The method of claim 8, wherein the resetting comprises:
   applying a reset ("RST") signal to a reset transistor of each pixel of the second row to reset a floating diffusion region of each pixel; and
   applying a sample-hold-reset ("SHR") signal, after applying the RST signal, to sample a reset voltage ("Vrst") of each pixel of the second row.

10. The method of claim 8, wherein the sampling a voltage comprises:
    applying a transfer ("TX") signal to a transfer transistor of each pixel of the second row to transfer an electrical charge accumulated by a photosensor of each pixel to a floating diffusion region of each pixel; and
    applying a sample-hold-sample ("SHS") signal to allow sampling of a signal voltage ("Vsig") from each pixel of the second row.

11. The method of claim 1, wherein the settling time comprises a minimum period of time for the charge storage capacity of each pixel of the second row to fully settle at the respective fourth capacity value.

12. A method for controlling a dual conversion gain of an imagining device, the method comprising:
    initiating, at a first instant, a sampling of a first row of pixels of a plurality of pixels of the imaging device, wherein a charge storage capacity of a second row of pixels of the plurality of pixels comprises a first charge capacity value at the first instant;

causing the charge storage capacity of the second row of pixels to begin changing to a second charge capacity value at a second instant, wherein the second instant is after the first instant;

completing the sampling of the first row at a third instant, wherein the third instant is after the second instant; and initiating a sampling of the second row of pixels at a fourth instant, wherein the fourth instant is after the third instant and wherein the fourth instant is a period of time after the causing, and wherein the period of time is at least equal to the settling time of the charge storage capacity.

13. The method of claim 12, wherein the settling time comprises:

a minimum period of time for the charge storage capacity to fully settle at the second charge capacity value.

14. The method of claim 12, wherein causing comprises:

applying a dual conversion gain ("DCG") signal to a DCG transistor of each pixel of the second row to connect a capacitor to each pixel of the second row.

15. The method of claim 12, wherein causing comprises:

removing a dual conversion gain ("DCG") signal from a DCG transistor of each pixel of the second row to disconnect a capacitor from each pixel of the second row.

16. The method of claim 12, further comprising:

causing, after the fourth instant, a plurality of charge storage capacities of a plurality of rows of the plurality of pixels to begin changing to the second charge capacity value.

17. The method of claim 12, further comprising:

completing the sampling of the second row at a fifth instant, wherein the fifth instant is after the fourth instant; and causing the charge storage capacity to begin changing to the first charge capacity in response to completing the sampling of the second row.

18. The method of claim 12, wherein the imaging device comprises at least one of a complementary metal-oxide-semiconductor ("CMOS") imaging device and a charge coupled device ("CCD") imaging device.

19. The method of claim 12, further comprising:

causing a charge storage capacity of a third row of pixels of the plurality of pixels to begin changing to the second charge capacity value at a fifth instant, wherein the fifth instant is after the fourth instant; and completing the sampling of the second row at a sixth instant, wherein the sixth instant is after the fifth instant.

20. The method of claim 12, wherein:

initiating a sampling of a first row of pixels comprises applying a reset signal to each pixel of the first row; and completing the sampling of the first row comprises applying a sample-hold-sample ("SHS") signal to read a signal voltage ("Vsig") from each pixel of the first row.

* * * * *